United States Patent [19]
Prokop et al.

[11] 3,805,632
[45] Apr. 23, 1974

[54] AUTOMATIC TRANSMISSION WITH FLUID OPERATED FREEWHEELING CLUTCHES

[75] Inventors: Joseph F. Prokop, Addison; Irvin A. Eickmeyer, La Grange, both of Ill.

[73] Assignee: International Harvester Company, Chicago, Ill.

[22] Filed: Sept. 2, 1971

[21] Appl. No.: 177,904

Related U.S. Application Data
[63] Continuation of Ser. No. 861,739, Sept. 29, 1969, abandoned.

[52] U.S. Cl............. 74/364, 192/87.17, 192/48.92, 192/103.4
[51] Int. Cl...................... F16d 25/10, F16d 21/08
[58] Field of Search........... 192/87.16, 87.14, 87.15, 192/87.17, 48.4, 48.92, 103 F, 105 F, 87.18, 87.19, 91 A, 87.12; 74/364, 368

[56] References Cited
UNITED STATES PATENTS

| | | | |
|---|---|---|---|
| 2,213,111 | 8/1940 | Strout | 192/18 A |
| 2,320,960 | 6/1943 | Wheaton | 192/87.17 X |
| 2,386,217 | 10/1945 | Kegresse | 192/87.18 X |
| 2,620,679 | 12/1952 | Issigonis et al. | 74/364 X |
| 2,775,330 | 12/1956 | Schjolin et al. | 192/87.16 |
| 2,926,765 | 3/1960 | Heid | 192/48.92 X |
| 3,187,598 | 6/1965 | Hennessey et al. | 74/368 |
| 3,251,442 | 5/1966 | Aschaver | 192/48.3 |
| 3,324,981 | 6/1967 | Aschaver | 192/89 B X |

FOREIGN PATENTS OR APPLICATIONS

| | | | |
|---|---|---|---|
| 238,203 | 10/1945 | Switzerland | 192/87.14 |

*Primary Examiner*—Benjamin W. Wyche
*Attorney, Agent, or Firm*—Ronald C. Kamp; Floyd B. Harman

[57] ABSTRACT

An improved multiple clutch unit for transmitting power from an input shaft to an output shaft at different speed ratios, the clutch unit having a clutch element hydraulically operated, a partial capacity clutch element being actuated by resilient means and having an overrunning clutch associated therewith, the clutch unit further having interconnecting means between the clutch elements so as to insure disengagement of one of said clutch elements when the other clutch element is engaged, unique hydraulic control means being provided for the unit.

5 Claims, 2 Drawing Figures

INVENTORS
JOSEF F. PROKOP
IRVIN A. EICKMEYER

3,805,632

AUTOMATIC TRANSMISSION WITH FLUID OPERATED FREEWHEELING CLUTCHES

This is a continuation of application Ser. No. 861,739, filed Sept. 29, 1969 now abandoned.

BACKGROUND OF THE INVENTION

This invention relates to the power transmission mechanism for selectively delivering power from an input shaft to an output shaft at different speed ratios and torque outputs. More specifically the instant invention is directed to a torque amplifying mechanism often utilized in series with a change speed transmission for selectively increasing the torque output delivered to said change speed transmission with a reduction in angular velocity. The instant invention also relates to an improved multiple clutch pack arrangement having unique operating advantages for utilization in any application in which two rotational speeds are desired from a simple change speed mechanism.

The power output requirements of many change speed mechanisms are not uniform, and in many instances it is desirable to have a capability to easily downshift from the normal operating requirements on a transmission to a lower speed ratio and greater torque output. Similarly, upshifting from the higher torque capacity to the normal torque output requirement and higher speed ratio must also be accomplished smoothly and without a power gap. For example, in farming operations in which a change speed transmission is often utilized, the operator of the tractor may momentarily need to increase his torque output due to a momentary load or draft increase. Disengagement of the main clutch, stopping of the vehicle and shifting of the change speed transmission is undesirable and results in a loss of time as well as other disadvantages. Hence, it is well known in the industry to provide a "torque amplifying mechanism" in series with the change speed transmission in which said torque amplifier facilitates downshifting, thus precluding a shifting of the change speed mechanism. One example of such prior art devices is disclosed in U.S. Pat. No. 3,187,598 issued to R. G. Hennessey et.al, and assigned to the assignee of the instant application. As will be obvious from the disclosure herein, such devices are amenable to improvement.

Therefore, it is a specific object of the instant invention to provide a unique and novel torque amplifier assembly which permits and facilitates downshifting. The provision of such a transmission assembly in which one clutch unit is always engaged regardless of the availability of fluid energy is another object of the instant invention. Similarly the proposed invention provides a system in which power transmission through the mechanism always commences at the larger torque output and in the lower speed ratio and may automatically upshift to the higher speed ratio as the vehicle gains momentum. It is a further object of the instant invention to provide the torque amplifier assembly which does not add to the angular momentum of the transmission assembly, but instead provides inherent braking means so as to reduce such angular momentum thereby facilitating the shifting of any change speed transmission in series with the instant torque amplifier assembly. Another object is to provide such an apparatus in which "lockup" of the mechanism is precluded.

By our invention, we also disclose and propose a unique and novel dual clutch element which may find various applications in any power output device in which two speeds are desired. For example our invention is ideally suited for applications in which a single forward and a single reverse power output is required, or in which two forward speeds are desired.

DESCRIPTION OF THE DRAWINGS

The manner in which these and other objects of the instant invention will be obtained will be made more clear through a consideration of the following specification and drawings in which.

DETAIL DESCRIPTION

Figure 1:
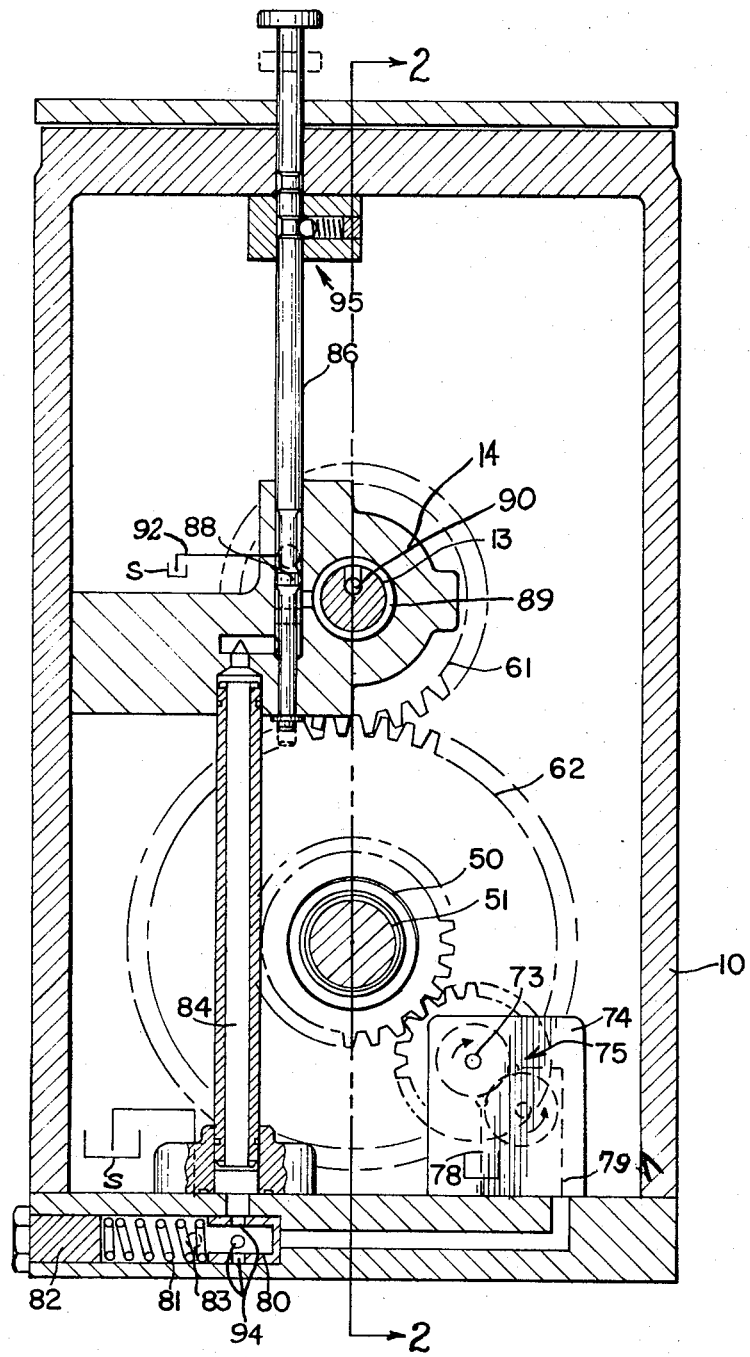
FIG. 1 is a front elevational view of the instant invention taken primarily in section.

As disclosed in the preferred embodiment, a frame 10 having web sections 11 and 12 therein as well as a bearing cage 14 carry a power input shaft 13 appropriately journaled therein by bearings (unnumbered) and an output shaft 50 in the form of a quill shaft surrounding a conventional independent power takeoff shaft 51 normally found in farm tractor vehicles. Forwardly of the power input shaft 13 may be a conventional clutch (not shown) and rearwardly of the instant invention may be a change speed transmission normally associated with agricultural vehicles to which power is delivered by the quill shaft or countershaft 50. Conventional lubricating means (not disclosed) may additionally be incorporated into the mechanism as desired.

Suitable transfer means are utilized for higher than normal torque output from the input shaft 13 to the countershaft 50 and may include a gear 61 rotatable on input shaft 13 for driving a gear 62 in constant mesh therewith, the latter being constrained for rotation with countershaft 50. Another transfer means for providing the normal lower torque output and higher speed ratio includes the gear 63 (having a pitch diameter larger than that of gear 61) carried by the input shaft 13 which is in constant mesh with the gear 64 also constrained for rotation with countershaft 50.

The coupling means for transferring power through either transfer means 61 and 62 or transfer means 63 and 64 comprises a unique multiple clutch unit 20 as well as an overrunning clutch member 26. Thus, a radial drum 21 is rotatably driven by input shaft 13 through a web portion 22 constrained for rotation with said input shaft 13 by a key 23 or other conventional means. A first clutch element 24 for coupling transfer means 61 and 62 with the power input shaft 13 utilizes friction discs 31 which are alternatively constrained for rotation with radial drum 21 by internal splines 30 therein and with hub 66 of gear 61 by external splines 68 thereon. Frictional engagement of the this partial capacity clutch element 24 is accomplished by resilient means shown here in the form of a Belleville washer 39 which urges a piston backing disc 40 forwardly so as to frictionally engage said discs 31 between a washer 42 and an abutment 28 held in place by snap ring 29. Thus it will be seen that the forward or first clutch element 24 is always urged into engagement so as to couple gear 61 with shaft 12.

Clutch element 24 is preferably a partial capacity clutch, and an overrunning clutch or a one-way sprag 26 is interposed between a counterbore of hub 66 and shaft 13 so as to be in combination with clutch element 24 to assist in transferring full torque input to the transfer means 61 and 62.

A second or rearward clutch element 25 is utilized to couple transfer means 63 and 22 together, and is similar to clutch element 24 with the exception that it is designed to carry the normal torque output requirements of input shaft 13 to transfer means 63 and 64, and when engaged the apparatus may be said to be in "direct drive". Thus internal splines 35 on radial drum 21, and external splines 69 on hub 67, formed integrally with gear 63, alternately carry friction disc 36. Fluid pressure behind a piston 37 will cause frictional engagement of friction disc 36 by compressing same between a washer 38 and an abutment 32 held in place by a snap ring 34. Connecting means between annular washer 38 and a piston 37 in the form of a bolt 41 will insure alternative engagement of clutch elements 24 or 25. The configuration of bolt 41 provides suitable abutting means to drive the piston 37 rearwardly to cause engagement of clutch element 25 and is appropriately provided with a key type socket shown in dotted lines for assembling the bolt with its nut. The roller bearings, seals, and snap rings are conveniently placed as needed but since such are so conventional further consideration thereof is not deemed necessary.

With reference to the functioning of the structure so far discussed, it will be observed that if partial capacity clutch element 24 is engaged, power will be transmitted through both the friction disc elements 31 and the one-way sprag 26 to transmit full power to hub 66, gear 61, gear 62 and thus the countershaft 50. Alternatively should fluid energy be directed to the rear of piston 37, the Belleville washer 91 will be retracted by bolt 41 and friction disc 36 will be engaged to transmit power to hub 67, gear 63, and thence to gear 64 constrained for rotation with countershaft 50. Engagement of clutch 25 causes disengagement of clutch 24 and due to the higher speed ratio of means 63, 64 shaft 50 will rotate faster than shaft 13 and clutch 26 is overrun or disengaged.

The shifting of the mechanism may be better understood by assuming that this assembly is incorporated into a farm tractor, and that the operator is operating through clutch means 25 in a condition referred to as direct drive. Should a higher draft load be imposed upon the tractor such that the operator needs to downshift to a higher torque output (by means hereinafter explained), fluid energy will be removed from piston 37 whereby resilient means 39 will cause engagement of clutch 24. To fully couple shaft 13 with gear 62, the vehicle must decelerate since this transfer means has a lower speed ratio than means 63, 64. Thus clutch 24, being only a partial capacity clutch allows some slippage until the vehicle slows down and sprag 26 engages. Thus, smooth downshifting occurs. Should clutch 24 have sufficient frictional lockup means as to completely couple transfer means 61 and 62, downshifting might initially rapidly decelerate the vehicle, jolting the operator.

Inasmuch as both gears 62 and 64 are constrained for rotation with countershaft 50 it is imperative that both sides of the coupling means be unable to transmit torque at the same time since any attempt to drive countershaft 50 at different speeds simultaneously would result in "lockup" of the unit and thus seriously damage the unit or preclude repair thereof. As disclosed, and assuming that forward drive is being delivered to input shaft 13 to the unit, it should be clear that such cannot occur since clutches 24 and 25 are alternatively engaged and since clutch 26 will also be disengaged or overrun upon actuation of clutch 25. However in the event of reverse drive, such as where the vehicle is ascending a hill and the vehicle starts to roll back, a condition of reverse drive may exist in which power is transmitted from the wheels of the vehicle to the countershaft 50 and then back to the engine through the main clutch. Under such circumstances devices of the prior art could permit lockup if the direct drive or clutch element 25 were engaged and pressure were being supplied to its piston, since such reverse drive would also engage one-way sprag 26 and the inherent result would be an attempt to transfer power from between countershaft 50 and input shaft 13 through both clutch element 25 and one-way sprag 26 at the different speeds corresponding to the gear teeth on each transfer means.

In order to overcome such a deficiency as well as to provide other advantages, the applicants propose a novel hydraulic control means. To more fully understand the proposed structures, reference will now be had to FIG. 1 in which a gear pump 75 within housing 74 is driven by countershaft 51 through gears 71, 72 and shaft 73. Upon rotation of shaft 50 and consequent actuation of the gear pump 75, fluid will be drawn from sump S through a conduit 78, around the gear pump and into pressure conduit 79. The conduit 79 passes into frame 10 to a drilled passage having a normal diameter and a larger diameter for carrying and seating a valve 80 urged forwardly by a spring 81 and held in place by cap means 82. Rearwardly of the valve means 80 is a conduit 83 leading to the sump S. Thus fluid pressure from the gear pump 75 will normally act against valve means 80 to urge same rearwardly and then pass through conduit 84 and into bearing cage 14 where it may be directed by land 88 of control spool 86 into an annulus 89 and into passage 90 of input shaft 13. Fluid then passes into a chamber rearwardly of piston 37 to urge same rearwardly and cause engagement of clutch element 25. The spring rate of element 81 should be selected so as to insure that sufficient fluid pressure is delivered to piston 37, when its engagement is desired and then act as a relief valve, by passing fluid to sump through conduit 83 should pressure exceed that required by clutch means 25. If the spool 86 is urged downwardly such that land 88 is in the dotted line position, fluid cannot enter the annulus 89 and conduit 90 but forces valve 80 rearwardly to uncover conduit 83. In this condition resilient means 39 causes engagement of partial capacity clutch 24 and any fluid behind piston 37 is forced out of said chamber into a conduit 92 leading to the sump S. Suitable detent means 95 are provided for indicating the position of the spool 86. As hereinafter explained this hydraulic system precludes lockup as well as providing other unique advantages.

MODE OF OPERATION (Accelerating)

Figure 2:
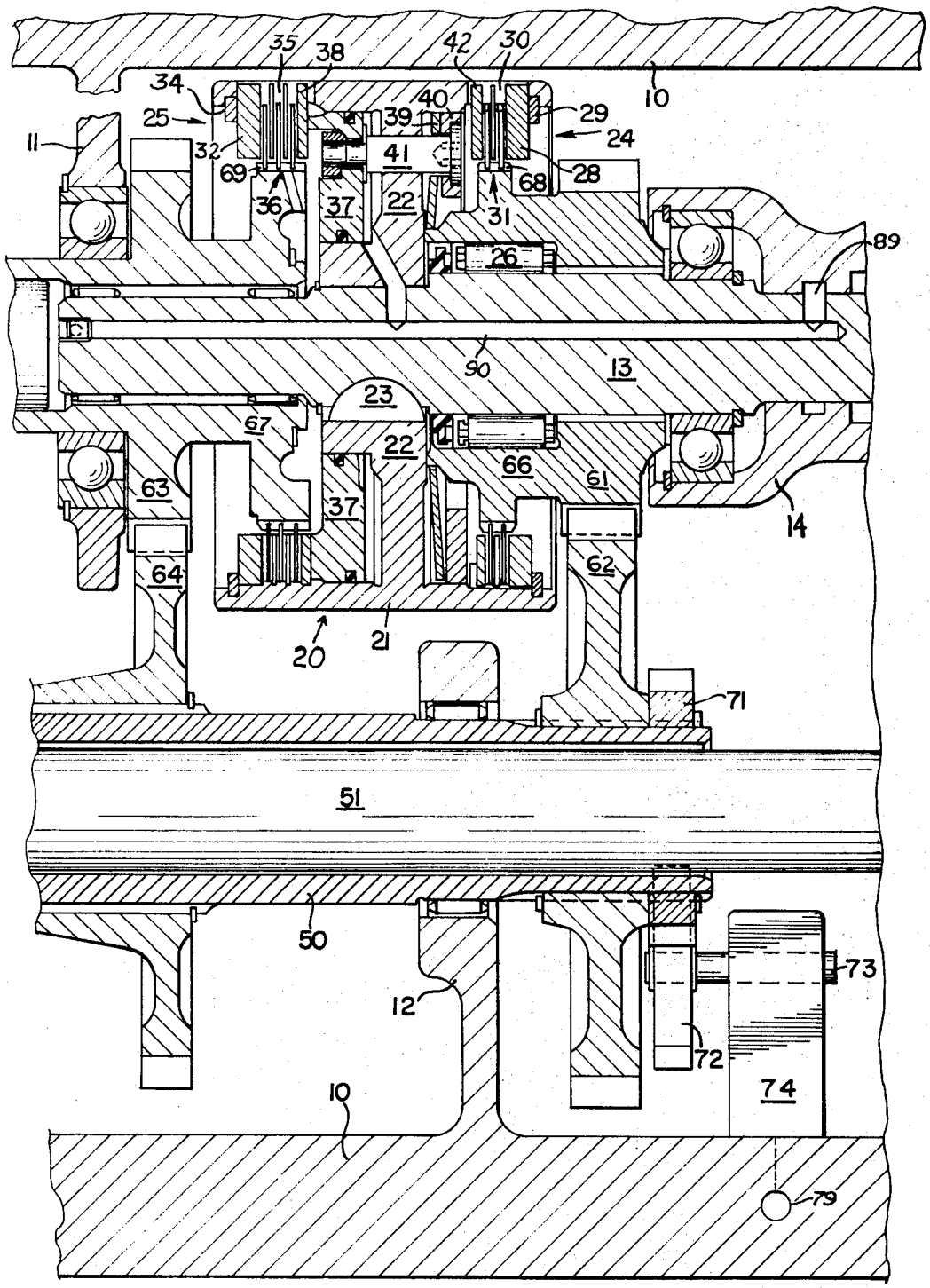
FIG. 2 is a sectional view taken along the lines 2—2 of FIG. 1.

Thus, considering together FIGS. 1 and 2 it will be observed that in the absence of any rotational motion of countershaft 50, there will be no fluid energy developed by the pump 75 to actuate the direct drive clutch 25 and regardless of the position of spool 86, resilient means 39 will cause engagement of the torque amplifying (T. A. clutch) clutch or clutch element 24 thereby coupling the transfer means 61 and 62 together and any power delivered through input shaft 13 will be transmitted to countershaft 50 by the partial capacity clutch 24 and the overrunning clutch 26. Thus, the hydraulic and valving means together with the resilient means 39 always insures that initial acceleration from zero velocity is created under a condition of maximum torque output and at a lower speed. If spool 86 is in its downward position, power will continue to be transmitted through the first coupling means.

Assuming however that after gaining velocity the operator of the vehicle desires to shift to a faster speed, he need only raise upwardly on spool 86 and fluid will be delivered from said pump 75 through the conduits aforementioned and against piston 37 to cause engagement of clutch element 25 and disengagement of partial capacity clutch element 24. Since transfer means 63 and 64 will rotate countershaft 50 at a faster speed than transfer means 61 and 62, engagement of the direct drive clutch 25 will cause the one-way sprag 26 to overrun. However, if the spool 86 is in its upper position upon starting movement, automatic shifting from the T. A. clutch 24 to direct drive clutch 25 occurs when the vehicle accelerates to a velocity to generate fluid energy from pump 75. The one-way sprag 26 and T. A. clutch 24 are engaged and remain engaged until sufficient fluid pressure is generated through rotation of the countershaft 50 to act against piston 37 and cause engagement thereof with consequent disengagement of clutch element 24, the one-way sprag 26 again being overrun.

In order to further insure that the vehicle always begins to accelerate in the higher torque ratio, apertures 94 are provided in spool 80 whereby fluid may drain or be dumped from behind piston 37 through the conduits 90 and 84 and into the sump S through conduit 83 should the vehicle be stopped with spool 86 in the upper or direct drive position. Thus immediately upon the cessation of vehicular movement the resilient means 39 causes disengagement of clutch element 35 and engagement of partial capacity clutch 24.

(Push Start)

A further unique and novel feature of the instant invention lies in the utilization of resilient means 39 which permits the operator of the vehicle to push start his engine. Being always engaged in the absence of fluid pressure, power may be transmitted from the wheels of the vehicle through the torque amplifier assembly to the engine to start same. Such can also be accomplished even though spool 86 is in the direct drive position because the pump 75 is not dependent upon the engine for delivering fluid pressure but instead is powered by the countershaft 50 through which the reverse drive will take place, although sufficient speed must be obtained to provide sufficient fluid energy from pump 75 to deactuate clutch 24 and engage clutch 25.

(Shifting)

The instant invention facilitates downshifting smoothly without a gap in power transmission since the higher torque output results in a decrease of speed. Thus, upon shifting spool 86 downwardly, the partial capacity clutch engages first and allows some slippage for smooth transition, and no shift shock occurs upon engagement of sprag 26 which takes place as vehicle speed is reduced. Similarly, the system also aids shifting of a change speed transmission in series with the instant invention. Assuming that the torque amplifier assembly herein disclosed is in series with a change speed transmission either before or after the instant combination, it should be apparent that the pump 75 within housing 74 will cause a drag upon rotational velocity of the assembly and thus act to decelerate same. This braking of the transmission exists regardless of the position of spool 86 since spring 81 always offers resistance to flow developed by pump 75. Accordingly in the event that the operator of the vehicle desires to shift his change speed transmission, the power requirement of the pump 75 will act as the decelerator so as to reduce the angular velocity of the assembly, and thus enable the operator to change speeds of the change speed transmission without clashing of gears.

(Lockup Prevention)

As previously alluded to, transmission lockup is prevented by the hydraulic system in that the pump 75 is driven by countershaft 50, and by the incorporation of fluid dump means 94. Thus, if the vehicle is ascending an incline with clutch 25 engaged, a reduction or loss of input power may permit the vehicle to roll backward and one-way sprag 26 may become engaged. To prevent lockup, clutch 25 must be disengaged and such is accomplished automatically since pump 75 will rotate backward with the reversed rotation of shaft 50 and no fluid pressure is delivered to piston 37. Thus, valve 80 closes and any fluid behind the piston 37 will be directed through apertures 94 of valve 80 into conduit 83 and to the sump.

Thus it should be apparent that applicants have proposed a very advantageous system for altering the speed of the input shaft. It should at once be apparent that the multiple clutch pack alone in the absence of the one-way sprag 26 will find novel application in which rapid and smooth upshifting or downshifting is desired. Too, either of the gears 61 or 63 may be associated with an idler so as to provide a reverse drive and the utilization of the instant dual clutch pack would provide drive in a preferred or one direction most of the time through automatic engagement of one clutch while hydraulic pressure could be utilized to engage the other clutch. Similarly, when proper gear ratios and a one-way sprag 26 is associated with said device, a unique torque amplifying apparatus is provided which assures that increased torque may be transmitted through one of the coupling means should the load require same and smooth downshifting is accomplished. Finally by associating our unique hydraulic means with the dual clutch pack and overrunning clutch initial acceleration is always at maximum torque output, and deceleration forces are always acting upon the instant invention so as to reduce any difficulties of effecting a change in speed of a transmission in series with this instant invention. Thus it should be apparent that the entire assembly as well as the various sub-combinations thereof will find unique and advantageous acceptance in various utilizations. It should be quite clear that interchangeability between the input and output shaft of the dual clutch pack could easily be accomplished or that the clutch elements might be separated, one upon each shaft, as well as effecting other obvious modifications.

We claim:
1. The combination comprising;
   1. a housing carrying first and second rotatable shafts, one of said shafts adopted to receive power from a source, and the other adopted to deliver power,
   2. a plurality of power transfer means having different speed ratios interconnecting said shafts,
   3. hydraulically actuated clutch means carried by one of said shafts for engaging one of said power transfer means, and
   4. a partial capacity clutch means including resilient actuating means and an overrunning clutch means carried by one of said shafts for engaging another of said power transfer means, said partial capacity clutch means and said hydraulically actuated clutch means being interconnected whereby engagement of one of said clutch means precludes engagement of said other clutch means,
   5. fluid energy producing means carried by said housing and driven by one of said shafts for actuating said hydraulically actuated clutch means, and
   6. valve means interconnected between said hydraulically actuated clutch means and said fluid energy producing means for automatically discharging fluid from said hydraulically operated clutch upon a reduction of fluid energy being delivered to said clutch.

2. A power transmission unit comprising:
   1. a housing,
   2. an input shaft and an output shaft carried by said housing;
   3. two power coupling means carried by one of said shafts for transferring power at different speed ratios to said other shaft;
   4. one coupling means carrying hydraulically actuated clutch means for actuating same,
   5. the other coupling means carrying a partial capacity clutch including resilient means for engaging same and for disengaging said hydraulically actuated clutch, and a one-way clutch in parallel with said partial capacity clutch so as to carry the full power load to be transferred to the other shaft, said partial capacity clutch permitting slippage until said one-way clutch engages.

3. An improved clutch means for transferring power from one shaft to another shaft comprising:
   1. a housing,
   2. a power input shaft and an output shaft carried by said housing,
   3. dual transfer means interconnecting said shafts for transmitting torque therebetween at different ratios, one of said transfer means including a clutch resiliently biased towards engagement of its associated transfer means, and a one-way clutch in parallel therewith, said other transfer means including a hydraulically actuatable clutch,
   4. means interconnecting said partial capacity clutch and said hydraulically actuated clutch for insuring alternative engagement thereof, and
   5. fluid power means in said housing and driven by one of said transfer means for actuating said second clutch so as to engage said second clutch and disengage said first clutch only upon rotation of said output shaft.

4. An apparatus as recited in claim 3 in which said fluid power means comprises:
   1. a manually operable valve for selectively directing fluid to said hydraulic clutch upon rotation of said transfer means,
   2. and automatic valve means for pumping fluid from said hydraulically actuated clutch when power is not transmitted through said power transfer means.

5. A two-speed transmission mechanism comprising:
   1. a housing,
   2. two parallel transversely disposed power shafts carried by said housing, one adapted to normally receive power and another adapted to deliver power,
   3. two power transfer means extending between said shafts and capable of transferring power at different speeds,
   4. one of said power transfer means comprising a partial capacity clutch resiliently biased towards engagement and a one-way clutch in parallel therewith,
   5. said other transfer means transmitting power at a higher speed and including a hydraulically actuated clutch,
   6. fluid power producing means driven by said transmission mechanism and carried by said housing for directing fluid power to said hydraulically actuated clutch,
   7. mechanical interconnection means between said partial capacity clutch and said hydraulically actuated clutch for insuring alternative engagement thereof, and power flow through only one of said power transfer means,
   8. valve means between said power producing means and said hydraulically actuated clutch for dumping fluid therefrom so as to permit rapid engagement of said partial capacity clutch, thus permitting said partial capacity clutch to engage before said one-way clutch and insure smooth engagement thereof.

* * * * *